US011799662B2

(12) United States Patent
Shahar et al.

(10) Patent No.: US 11,799,662 B2
(45) Date of Patent: Oct. 24, 2023

(54) EFFICIENT DATA ITEM AUTHENTICATION

(71) Applicant: SONY SEMICONDUCTOR ISRAEL LTD., Hod Hasharon (IL)

(72) Inventors: Boaz Shahar, Raanana (IL); Yehuda Ben Simon, Ramat Hasharon (IL); Avishay Sharaga, Beit Nehemya (IL)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 235 days.

(21) Appl. No.: 17/175,718

(22) Filed: Feb. 15, 2021

(65) Prior Publication Data

US 2022/0263661 A1 Aug. 18, 2022

(51) Int. Cl.
*H04L 29/06* (2006.01)
*H04L 9/32* (2006.01)
*H04L 9/14* (2006.01)
*H04L 9/08* (2006.01)

(52) U.S. Cl.
CPC .......... *H04L 9/3242* (2013.01); *H04L 9/0825* (2013.01); *H04L 9/0894* (2013.01); *H04L 9/14* (2013.01); *H04L 9/3247* (2013.01); *H04L 9/3265* (2013.01)

(58) Field of Classification Search
CPC ......... H04L 9/32; H04L 9/088; H04L 9/3213; H04L 9/3247; H04L 9/3271; H04L 63/0807; H04L 63/0853; H04L 9/0861; G06F 7/58
See application file for complete search history.

(56) References Cited

U.S. PATENT DOCUMENTS

| 4,783,798 | A  | * | 11/1988 | Leibholz | H04L 9/3226 713/181 |
| 8,181,035 | B1 | * | 5/2012 | Fernandez | H04L 9/14 713/176 |
| 8,976,964 | B2 | * | 3/2015 | Shimamura | H04L 9/088 713/168 |
| 9,882,720 | B1 | * | 1/2018 | Levy | H04L 9/3247 |
| 10,558,589 | B1 | * | 2/2020 | de Cesare | G06F 21/78 |
| 10,587,416 | B1 | * | 3/2020 | Yavuz | H04L 9/50 |

(Continued)

FOREIGN PATENT DOCUMENTS

| CN | 1835623 | A | * | 9/2006 | |
| CN | 105956844 | A | * | 9/2016 | ........... G06Q 20/206 |

(Continued)

OTHER PUBLICATIONS

Ronen et al., "IoT Goes Nuclear: Creating a ZigBee Chain Reaction", Cryptology ePrint Archive: Report 2016/1047; pp. 1-18, year 2016.

*Primary Examiner* — Sher A Khan
(74) *Attorney, Agent, or Firm* — KLIGLER & ASSOCIATES PATENT ATTORNEYS LTD

(57) ABSTRACT

In one embodiment, an apparatus includes a storage element, and a processing element configured to verify an asymmetric digital signature in order to authenticate a data item signed with the asymmetric digital signature, upon successful verification of the asymmetric digital signature, generate a symmetric MAC of the data item and store the symmetric digital in the storage element, and retrieve and verify the symmetric MAC in order to authenticate the data item.

23 Claims, 4 Drawing Sheets

(56) References Cited

U.S. PATENT DOCUMENTS

| | | | | |
|---|---|---|---|---|
| 2004/0128252 | A1* | 7/2004 | Shirai | G06F 21/10 |
| | | | | 705/59 |
| 2005/0172134 | A1* | 8/2005 | Thornton | G06F 21/606 |
| | | | | 713/182 |
| 2006/0253703 | A1* | 11/2006 | Eronen | H04W 12/0433 |
| | | | | 713/156 |
| 2009/0193261 | A1* | 7/2009 | Yang | H04L 9/3242 |
| | | | | 713/181 |
| 2009/0290708 | A1* | 11/2009 | Schneider | H04L 9/0822 |
| | | | | 380/46 |
| 2010/0142706 | A1* | 6/2010 | Ryan, Jr. | H04L 63/0442 |
| | | | | 380/51 |
| 2012/0260095 | A1* | 10/2012 | Von Hauck | H04W 4/60 |
| | | | | 713/176 |
| 2014/0359268 | A1* | 12/2014 | Jauhiainen | G06F 21/44 |
| | | | | 713/168 |
| 2017/0310653 | A1* | 10/2017 | Zhang | H04L 63/0838 |
| 2017/0339115 | A1* | 11/2017 | Cho | H04W 12/062 |
| 2019/0052466 | A1* | 2/2019 | Bettger | H04L 63/123 |
| 2019/0052467 | A1* | 2/2019 | Bettger | H04L 9/088 |
| 2022/0103369 | A1* | 3/2022 | Adams | H04L 9/3234 |

FOREIGN PATENT DOCUMENTS

| | | | | | |
|---|---|---|---|---|---|
| CN | 106384059 | A | * | 2/2017 | |
| CN | 106452752 | A | * | 2/2017 | ......... H04L 63/0428 |
| CN | 107408081 | A | * | 11/2017 | ......... G06F 12/0875 |
| CN | 112149146 | A | * | 12/2020 | ......... G06F 21/602 |
| CN | 114254402 | A | * | 3/2022 | ........... G06F 3/0622 |
| DE | 102020212451 | A1 | * | 4/2022 | ........... H04L 9/3242 |
| KR | 101256114 | B1 | * | 4/2013 | ......... H04L 63/0428 |

* cited by examiner

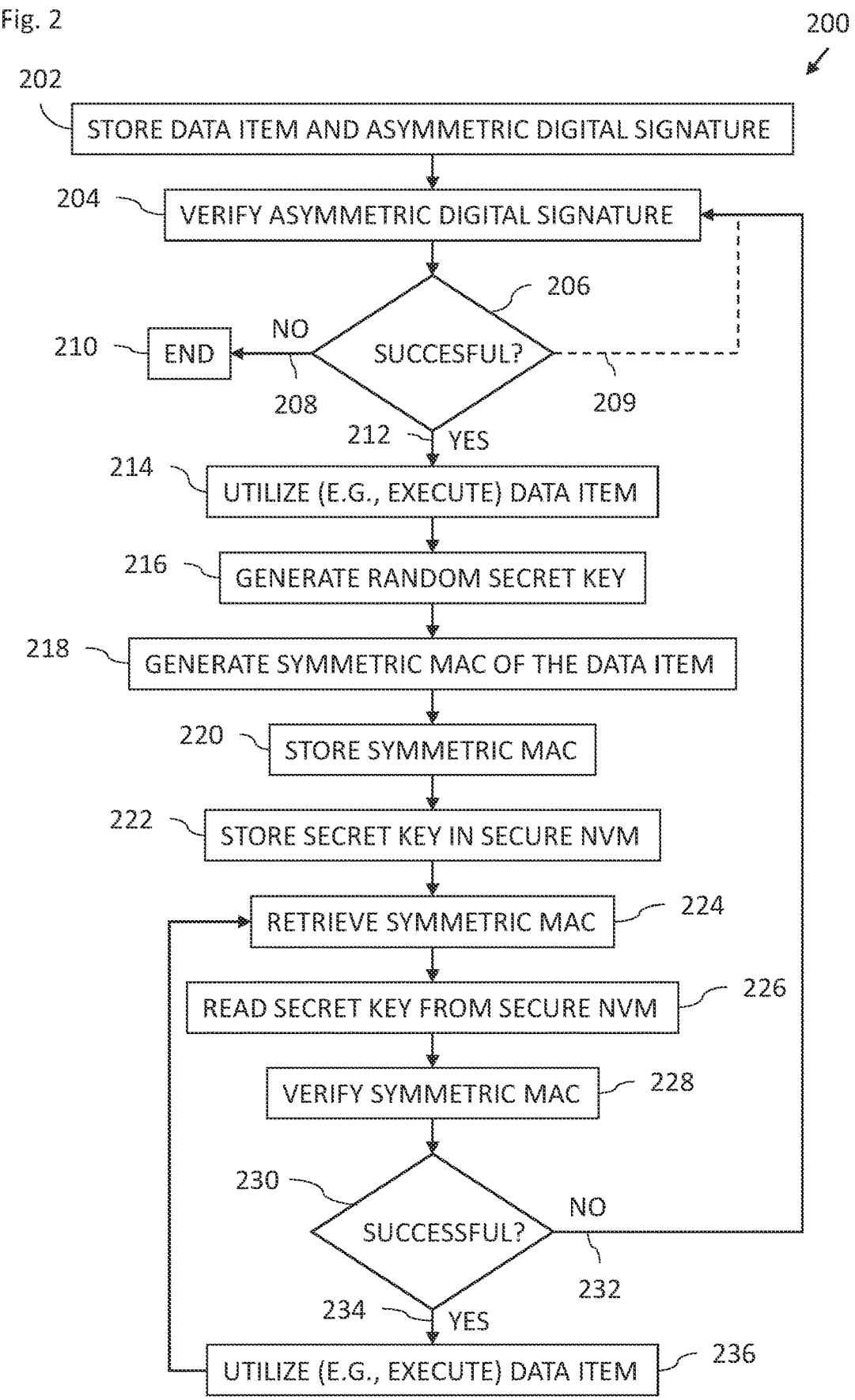

EFFICIENT DATA ITEM AUTHENTICATION

FIELD OF THE INVENTION

The present invention relates to computing devices, and in particular, but not exclusively, to data item authentication.

BACKGROUND

Authenticity of a data item (e.g., software, a certificate, an email) may be secured using digital signatures. Data items are typically secured using asymmetric signatures whereby a data item is signed with an asymmetric signature by an originator of the data item using a creation key (e.g., a private key of the originator), which is only available to the originator. A recipient of the data item (for example, a certificate, software code, or any binary or other data object) may confirm authenticity of the data item by verifying the asymmetric signature using a verification key (e.g., a public key of the originator) known to the recipient (and typically others). Assuming that the private key is secured, such digital signatures are secure and generally provide protection against modification of the data item by non-authorized entities such as hackers, insertion of a non-authentic data item, or deletion of the data item, and non-repudiation attacks.

SUMMARY

There is provided in accordance with an embodiment of the present disclosure, an apparatus including a storage element, and a processing element configured to verify an asymmetric digital signature in order to authenticate a data item signed with the asymmetric digital signature, upon successful verification of the asymmetric digital signature, generate a symmetric of the data item and store the symmetric MAC in a storage element, and retrieve and verify the symmetric MAC in order to authenticate the data item.

Further in accordance with an embodiment of the present disclosure the asymmetric digital signature is computed using a private key and the processing element is configured to verify the asymmetric digital signature using a public key corresponding with the private key.

Still further in accordance with an embodiment of the present disclosure, the apparatus includes a secure non-volatile memory, and wherein the processing element is configured to generate a random secret key, store the secret key in the secure non-volatile memory, generate the symmetric MAC responsively to the secret key and the data item, read the secret key from the secure non-volatile memory, and verify the symmetric MAC responsively to the secret key and the data item.

Additionally, in accordance with an embodiment of the present disclosure the processing element is configured to repeatedly verify the symmetric MAC to repeatedly authenticate the data item.

Moreover, in accordance with an embodiment of the present disclosure the processing element is configured to generate respective different symmetric MACs of the data item, and verify the respective different symmetric MACs to repeatedly authenticate the data item.

Further in accordance with an embodiment of the present disclosure the processing element is configured to generate respective random secret keys, generate the respective different symmetric MACs responsively to the respective random secret keys and the data item, verify the respective different symmetric MACs responsively to the respective random secret keys and the data item, and overwrite each of the respective random secret keys after being read for use in verifying each of the respective symmetric MACs.

Still further in accordance with an embodiment of the present disclosure the processing element is configured to overwrite each of the respective random secret keys prior to verification of a subsequent one of the respective different symmetric MACs.

Additionally, in accordance with an embodiment of the present disclosure, the apparatus includes a secure non-volatile memory, and wherein the processing element is configured to overwrite a previous one of the random secret keys with a newly generated one of the random secret keys in the secure non-volatile memory, wherein only one of the random secret keys is stored in the secure non-volatile memory at any one time.

Moreover, in accordance with an embodiment of the present disclosure the processing element includes a second memory, the processing element is configured to read the previous random secret key from the secure non-volatile memory and write the read previous random secret key into the second memory, and then overwrite the previous random secret key with the newly generated random secret key in the secure non-volatile memory, the processing element is configured to verify a respective one of the symmetric MACs stored in the storage element responsively to the previous random secret key currently in the second memory, and the processing element is configured to generate a new one of the symmetric MACs responsively to the data item and the newly generated random secret key, and store the new symmetric MAC in the storage element.

Further in accordance with an embodiment of the present disclosure the data item is boot image.

Still further in accordance with an embodiment of the present disclosure the data item is a digital certificate signed with a private key of a certificate authority.

There is also provided in accordance with another embodiment of the present disclosure, an authentication method, including verifying an asymmetric digital signature in order to authenticate a data item signed with the asymmetric digital signature, upon successful verification of the asymmetric digital signature, generating a symmetric MAC of the data item and storing the symmetric digital, and retrieving and verifying the symmetric MAC in order to authenticate the data item.

Additionally, in accordance with an embodiment of the present disclosure the asymmetric digital signature is computed using a private key and the verifying includes verifying the asymmetric digital signature using a public key corresponding with the private key.

Moreover, in accordance with an embodiment of the present disclosure, the method includes generating a random secret key, store the secret key, generating the symmetric MAC responsively to the secret key and the data item, and retrieving the secret key, and wherein the verifying includes verifying the symmetric MAC responsively to the secret key and the data item.

Further in accordance with an embodiment of the present disclosure, the method includes repeatedly verifying the symmetric MAC to repeatedly authenticate the data item.

Still further in accordance with an embodiment of the present disclosure, the method includes generating respective different symmetric MACs of the data item, and verifying the respective different symmetric MACs to repeatedly authenticate the data item.

Additionally, in accordance with an embodiment of the present disclosure, the method includes generating respective random secret keys, generating the respective different symmetric MACs responsively to the respective random secret keys and the data item, wherein the verifying the respective different symmetric MACs includes verifying the respective different symmetric MACs responsively to the respective random secret keys and the data item, and overwriting each of the respective random secret keys after being read for use in verifying each of the respective symmetric MACs.

Moreover, in accordance with an embodiment of the present disclosure the overwriting includes overwriting each of the respective random secret keys prior to verification of a subsequent one of the respective different symmetric MACs.

Further in accordance with an embodiment of the present disclosure, the method includes overwrite a previous one of the random secret keys with a newly generated one of the random secret keys in a secure non-volatile memory, wherein only one of the random secret keys is stored in the secure non-volatile memory at any one time.

Still further in accordance with an embodiment of the present disclosure, the method includes reading the previous random secret key from the secure non-volatile memory and writing the read previous random secret key into a second memory, and then performing the overwriting of the previous random secret key with the newly generated random secret key in the secure non-volatile memory, verifying a respective one of the symmetric MACs responsively to the previous random secret key currently in the second memory, generating a new one of the symmetric MACs responsively to the data item and the newly generated random secret key, and storing the new symmetric MAC.

Additionally, in accordance with an embodiment of the present disclosure the data item is boot image.

Moreover, in accordance with an embodiment of the present disclosure the data item is a digital certificate signed with a private key of a certificate authority.

There is also provided in accordance with still another embodiment of the present disclosure, a software product, including a non-transient computer-readable medium in which program instructions are stored, which instructions, when read by a central processing element (CPU), cause the CPU to store a data item signed with an asymmetric digital signature, verify the asymmetric digital signature in order to authenticate the data item, upon successful verification of the asymmetric digital signature, generate a symmetric MAC of the data item and store the symmetric MAC, and retrieve and verify the symmetric MAC in order to authenticate the data item.

BRIEF DESCRIPTION OF THE DRAWINGS

The present invention will be understood from the following detailed description, taken in conjunction with the drawings in which:

FIG. 2 is a flowchart including steps in a method of signature verification in the apparatus of FIG. 1.

DESCRIPTION OF EXAMPLE EMBODIMENTS

Overview

Figure 1:
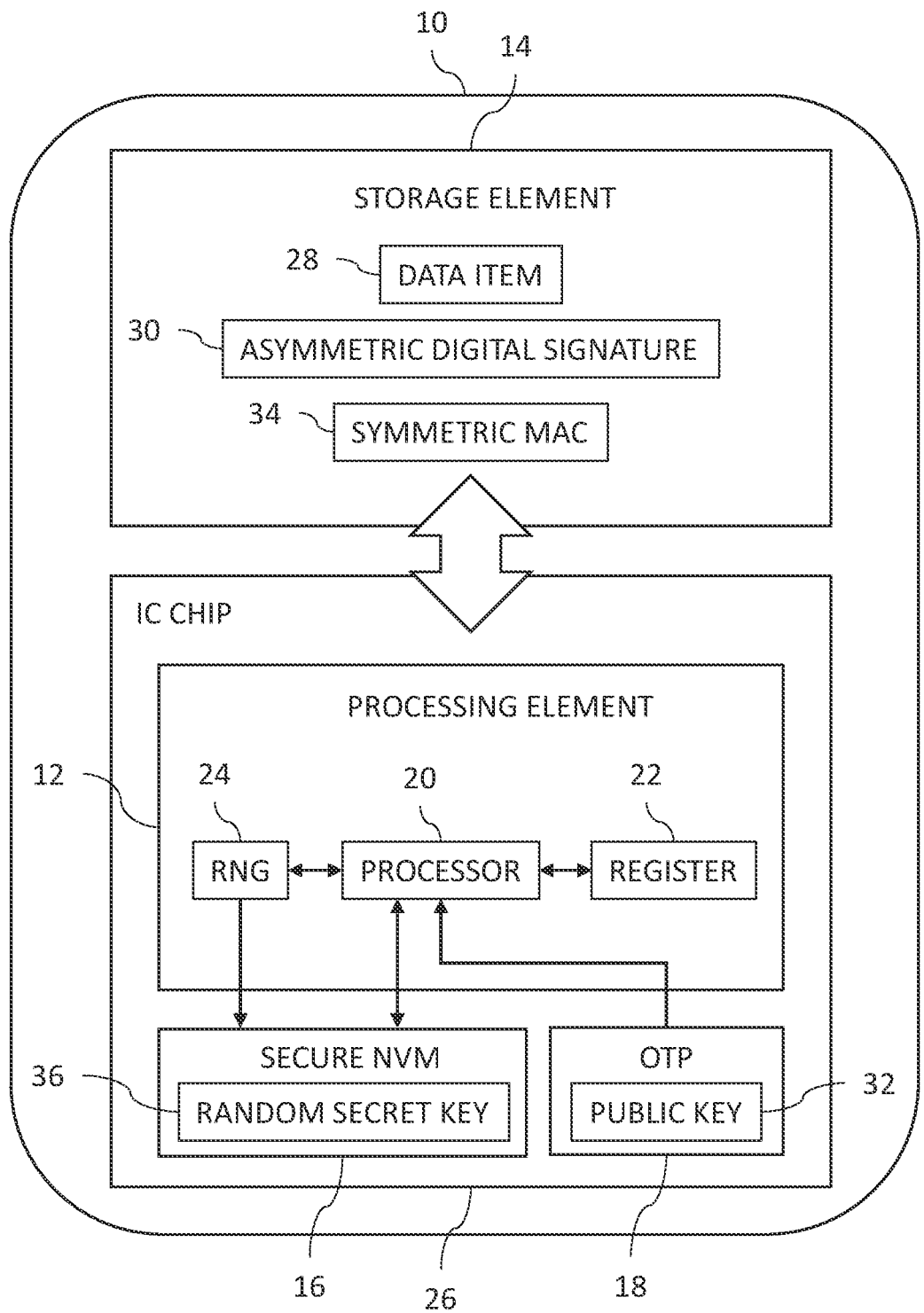
FIG. 1 is a block diagram of an apparatus constructed and operative in accordance with an embodiment of the present invention.

As previously mentioned, asymmetric signatures provide a high level of assurance that the signed data item is authentic. However, one disadvantage of using asymmetric signatures is that the verification process is resource intensive. This is a particular challenge when data items are authenticated in constrained devices (e.g., IoT (Internet of Things) devices, such as sensors, actuators, and other devices connected to the Internet, or mobile devices). Devices may be constrained in any one or more ways, for example, computing power constrained, memory constrained, electrical power constrained (e.g., battered powered).

One solution is to use symmetric message authentication codes (MACs) instead of asymmetric signatures, in which the originator of the data item generates a symmetric MAC for the data item including processing the data item in accordance with an algorithm (such as a hash algorithm) responsively to a key. The key is also shared with the recipient of the data item. The data item is authenticated by verifying the symmetric MAC using the received key. Although verifying a symmetric MAC is generally less resource intensive than verifying an asymmetric signature, a symmetric MAC is vulnerable to non-repudiation attacks (and class attacks) by anyone who manages to acquire the key (e.g., by intercepting the key when the key is transferred from the originator to the recipient, or extracting the key from a holder of the key). MAC functions generally require a class shared symmetric key between the signer (e.g., the originator of the data item) and all the authenticators (e.g., all the chips on which the data item is utilized). The key is typically valid for the life of the data item. The class shared symmetric key is very vulnerable to any attack that can disclose the symmetric key. Once the key is known, all devices are hacked. This is a very crucial security problem, as once the symmetric key is extracted from one chip, even if this chip is destroyed during the key extraction process, all chips are then hacked, because all of them use the same symmetric key. Therefore, symmetric MACs are generally not used for authentication in one-to-many scenarios. Additionally, a symmetric MAC is generally not a signature method approved by any regulatory body.

Embodiments of the present invention solve the above problems by combining asymmetric signature authentication with symmetric MAC verification. The symmetric key or keys are generally unique per authentication device and therefore even if the symmetric key is stolen it cannot be used to hack other authentication devices. In some embodiments, the symmetric key is changed frequently thereby improving security further.

A recipient of a data item initially checks authentication of the data item using an asymmetric digital signature supplied by the originator of the data item (for example, using a public key of the originator) thereby authenticating the data item as being from the originator. Once the asymmetric signature has been verified, the recipient generates a symmetric MAC using a secret key generated by the recipient. The secret key and the symmetric MAC are stored by the recipient. The next time the data item needs to be authenticated by the recipient, the symmetric MAC is verified by the recipient responsively to the data item and the secret key. As the secret key is generated and stored by the recipient, the data item is protected from a non-repudiation attack. In some embodiments, the data item may be repeatedly authenticated using the symmetric MAC and the generated secret key. The secret key is generally stored in a secure non-volatile memory (NVM) to prevent key theft. Therefore, the combination of initially authenticating the asymmetric digital signature and then subsequently verifying a locally generated symmetric MAC or MACs instead of continuing to use the asymmetric digital signature maintains most of the security properties provided by the asymmetric digital signature while allowing less resource intensive verification.

In some embodiments, each time a symmetric MAC of the data item is successfully verified, a new symmetric MAC is generated from a newly generated secret key, and the new symmetric MAC is used with the newly generated secret key to authenticate the data item the next time the data item needs authenticating. In this manner, the verification process is protected against side-channel analysis attacks which may try to steal a single secret key so that even if the key is stolen any resulting damage is limited.

In some embodiments, the secret key which is going to be used in the verification process is read from secure NVM into a second memory, e.g., processor register, and the newly generated secret key is written to the secure NVM overwriting the secret key currently stored in the secure NVM. The secret key currently in the second memory (e.g., processor register) may then be used by the processor to verify the current symmetric MAC. In this manner, exposure of the secret keys to side-channel analysis attacks is further reduced.

The above authentication process is particularly useful for data items that need to be repeatedly authenticated by the same device. The data items being authenticated may include any suitable data items, such as software, a boot process, and digital certificates (such as TLS certificates).

System Description

Reference is now made to FIG. 1, which is a block diagram of an apparatus 10 constructed and operative in accordance with an embodiment of the present invention. The apparatus 10 may be a constrained device (e.g., IoT device, such as a sensor, an actuator, and/or a device connected to the Internet, and/or a mobile device). The apparatus 10 may be constrained in any one or more ways, for example, computing power constrained, memory constrained, electrical power constrained (e.g., battered powered). The apparatus 10 includes a processing element 12, a storage element 14 (e.g., Flash memory), a secure non-volatile memory (NVM) 16, and a one-time programable memory 18. The secure non-volatile memory 16 may be secured by protecting it against security breaches. For example, the secure non-volatile memory 16 may be covered with a tamper proof casing which if penetrated makes the secure non-volatile memory 16 non-operational. In some embodiments, the storage unit 14, the secure non-volatile memory 16, and the one-time programable memory 18 may be replaced with any suitable memory unit or combination of memory units. The processing element 12 may include a processor 20 to perform processing tasks described herein, a memory (e.g., register 22) used by the processor 20, and a random number generator (RNG) 24. The random number generator 24 may comprise a true random number generator or a pseudo-random number generator, by way of example. In some embodiments, the processing element 12, secure non-volatile memory 16, and the one-time programable memory 18 are disposed on an integrated circuit (IC) chip 26, while the storage unit 14 is disposed externally to the integrated circuit chip 26 and is connected to the integrated circuit chip 26 via a suitable interface. In other embodiments, the elements of the apparatus 10 may be arranged differently.

The storage element 14 is configured to optionally store a data item 28 signed with an asymmetric digital signature 30.

In some embodiments the data item 28 and/or the asymmetric digital signature 30 are not stored in the storage element 14 but may be stored remotely and retrieved for processing. The asymmetric digital signature 30 is computed by the originator of the data item 28 using a private key of the originator. The data item 28 may be any suitable data item, such as a boot image, or a digital certificate signed with a private key of a certificate authority.

In practice, some or all of the functions of the processing element 12 may be combined in a single physical component or, alternatively, implemented using multiple physical components. These physical components may comprise hardwired or programmable devices, or a combination of the two. In some embodiments, at least some of the functions of the processing element 12 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Other items shown in FIG. 1 are described with reference to FIGS. 2 and 3A-B.

Reference is now made to FIG. 2, which is a flowchart 200 including steps in a method of signature verification in the apparatus 10 of FIG. 1. Reference is also made to FIG. 1.

The processing element 12 is configured to receive the data item 28 and the asymmetric digital signature 30 from the originator (not shown) and optionally store (block 202) the data item 28 and the asymmetric digital signature 30 in the storage element 14.

The processing element 12 is configured to verify (block 204) the asymmetric digital signature 30 in order to authenticate the data item 28. In some embodiments, the processing element 12 is configured to verify the asymmetric digital signature 30 using a public key 32 corresponding with the private key used to sign the data item 28 by the originator. The public key 32 may be stored in the one-time programable memory 18 and read by the processing element 12 as needed.

At a decision block 206, if the verification of the asymmetric digital signature 30 was unsuccessful (branch 208) the process ends (block 210) or optionally the step of block 204 may be reperformed one or more times (branch 209). Upon successful verification of the asymmetric digital signature 30 (branch 212), the processing element 12 is configured to: utilize (block 214) the data item 28 (e.g., execute the data item 28, or use data from the data item 28 such as data from a digital certificate); generate (block 216) a random secret key 36; generate (block 218) a symmetric MAC 34 of the data item 28; store (block 220) the symmetric MAC 34 in the storage element 14; and store (block 222) the random secret key 36 in the secure non-volatile memory 16.

The step of block 214 may be performed after the step of block 216, for example, after the step of block 222. The steps described herein may be performed in any suitable order.

In some embodiments, the random number generator 24 is configured to generate the random secret key 36 and store the random secret key 36 in the random secret key 36, for example, via a direct connection between the random number generator 24 and the random secret key 36. In other embodiments, the processor 20 is configured to generate the random secret key 36 based on a random number seed generated by the random number generator 24 or from other data such as a clock time.

The processor 20 is configured to generate the symmetric MAC 34 responsively to the random secret key 36 and the data item 28. In some embodiments, the symmetric MAC 34 is an HMAC (e.g., keyed-hash message authentication code or hash-based message authentication code) computed by the processor 20 with the data item 28 as input and the random secret key 36 as the HMAC key. In some embodiments, the symmetric MAC 34 may be computed by hashing the data item 28 using a suitable (cryptographic) hashing algorithm (e.g., SHA-3 or BLAKE3) (optionally using a suitable key such as the random secret key 36) and optionally encrypting the outputted hash value using a symmetric encryption algorithm, such as AES or triple-DES, with the random secret key 36 as the encryption key.

Upon request (for example, responsively to a user action (e.g., powering up the apparatus 10) or a system action (e.g., attempting to run software) the processing element 12 is configured to: retrieve (block 224) the symmetric MAC 34 and the data item 28 from the storage element 14, and read (block 226) the random secret key 36 from the secure non-volatile memory 16 and verify (block 228) the symmetric MAC 34 responsively to the data item 28 and the random secret key 36 in order to authenticate the data item 28.

In some embodiments, the processing element 12 is configured to compute an HMAC of the data item 28 as input and the random secret key 36 as the HMAC key and then compare the computed HMAC to the symmetric MAC 34 to verify the symmetric MAC 34.

In some embodiments, the processing element 12 is configured to hash the data item 28 using a suitable (cryptographic) hashing algorithm (e.g., SHA-3 or BLAKE3) (optionally using a suitable key such as the random secret key 36) and optionally encrypt the outputted hash value using a symmetric encryption algorithm, such as AES or triple-DES, with the random secret key 36 as the encryption key. The processing element 12 is then configured to compare the hash or encrypted hash to the symmetric MAC 34 to verify the symmetric MAC 34.

At a decision block 230, if the verification of the symmetric MAC 34 was unsuccessful (branch 232) the process continues with the step of block 204 where the asymmetric digital signature 30 is verified (e.g., using the public key 32) in order to authenticate the data item 28. If the verification of the symmetric MAC 34 is successful (branch 234), the processing element 12 is configured to utilize (block 236) the data item 28 (e.g., execute the data item 28, or use data from the data item 28 such as data from a digital certificate). Upon a request to authenticate the data item 28 another time, processing continues with the step of block 224. In this manner, the processing element 12 is configured to repeatedly verify the symmetric MAC 34 to repeatedly authenticate the data item 28 in different verification rounds.

Figure 3A:
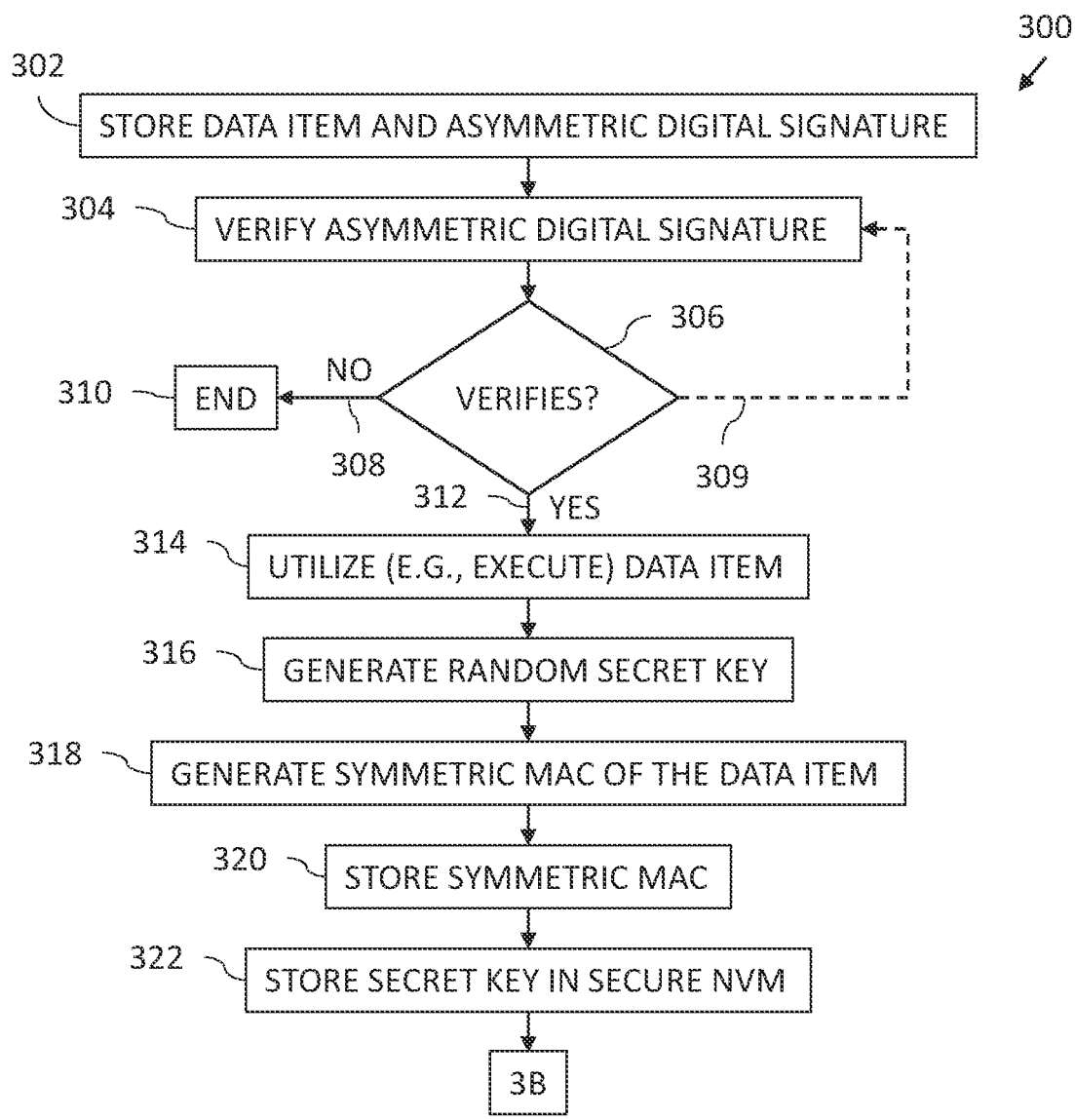
FIGS. 3A-B are a flowchart including steps in an alternative method of signature verification in the apparatus of FIG. 1.
Figure 3B:
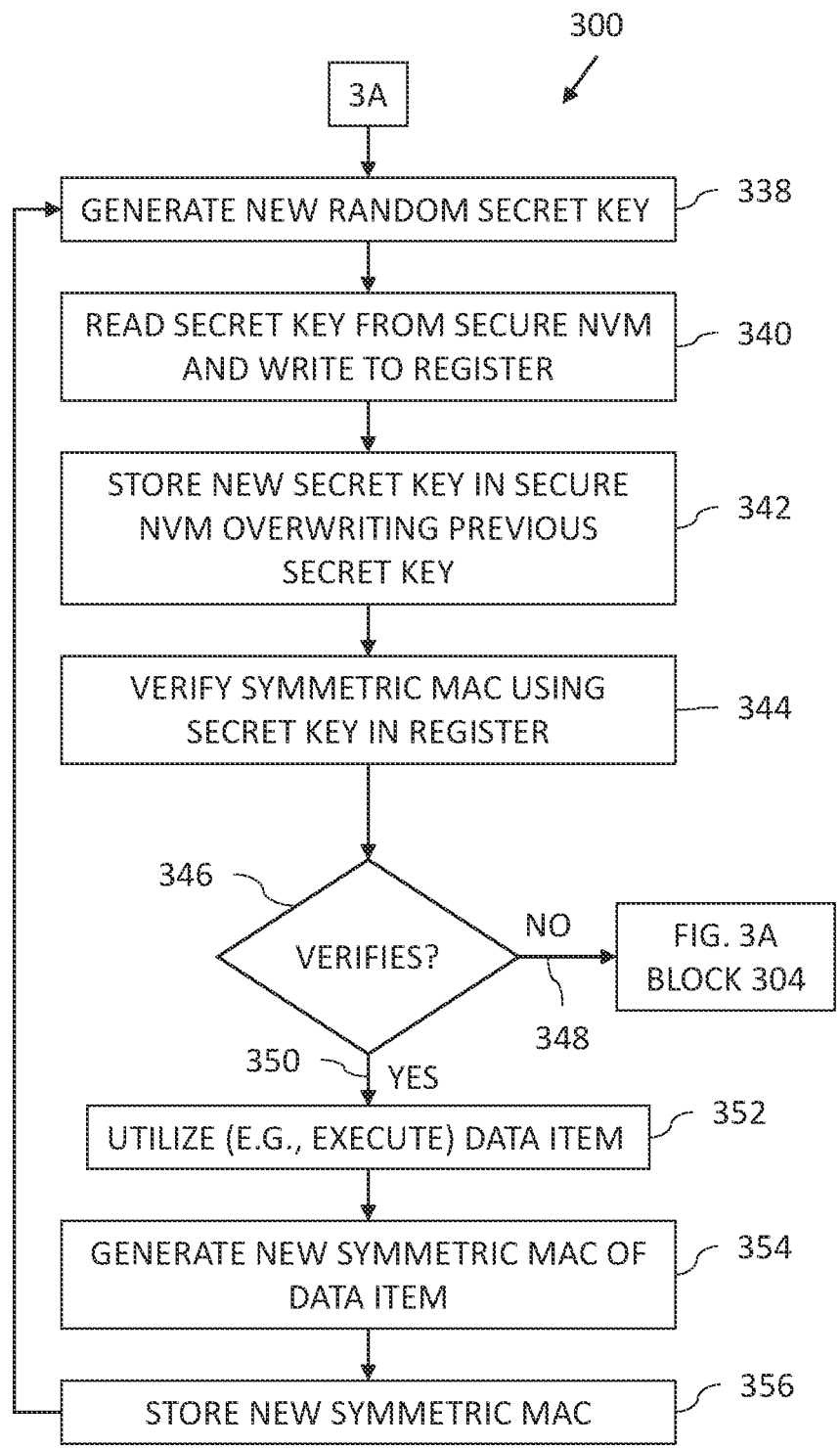

Reference is now made to FIGS. 3A-B, which together show a flowchart 300 including steps in an alternative method of signature verification in the apparatus 10 of FIG. 1. Reference is also made to FIG. 1. The method described with reference to FIGS. 3A-B is substantially the same as the method described with reference to FIG. 2 except that in the method described with reference to FIGS. 3A-B the secret key 36 and therefore the resulting symmetric MAC 34 is different in each verification round to protect against side-channel analysis attacks. Therefore, in some embodiments, the processing element 12 is configured to: generate (in different verification rounds) respective different symmetric MACs 34 of the data item 28; and verify the respective different symmetric MACs 34 to repeatedly authenticate the data item 28 (in the respective different verification rounds). In some embodiments, the processing element 12 is configured to: generate respective random secret keys 36 (in the different verification rounds); generate respective different symmetric MACs 34 (in the different verification rounds) responsively to the respective random secret keys 36 and the data item 28; verify the respective different symmetric MACs 34 (in the different verification rounds) responsively to the respective random secret keys 36 and the data item 28; and optionally overwrite each respective random secret key 36 (in the secure non-volatile memory 16) after being read for use in verifying each of the respective symmetric MACs 34. In some embodiments, the processing element 12 is configured to overwrite each respective random secret key 36 prior to verification of a subsequent symmetric MAC 34, as described in more detail below.

Therefore, the steps, decisions, and branches labeled with reference numerals 302 to 322 shown in FIG. 3A generally correspond to the steps, decisions, and branches labeled with reference numerals 202 to 222 in FIG. 2, except that in the flowchart 300, after the step of block 322, the flowchart 300 continues with a block 338 shown in FIG. 3B (where the random secret key 36 is changed in each verification round), as described in more detail below. The step of block 314 may be performed after the step of block 316, for example, after the step of block 322. The steps described herein may be performed in any suitable order.

Upon request (for example, responsively to a user action (e.g., powering up the apparatus 10) or a system action (e.g., attempting to run software), at the step of block 338, the processing element 12 is configured to generate a new random secret key 36. The processing element 12 is configured to read (block 340) the previous random secret key 36 (i.e., the random secret key 36 generated most recently prior to the generation of the new random secret key 36) from the secure non-volatile memory 16 and write the read previous random secret key 36 into the register 22 (or any suitable memory). Then, in some embodiments, the processing element 12 is configured to store (block 342) the newly generated random secret key 36 in the secure non-volatile memory 16 overwriting the previous random secret key 36 with the newly generated random secret key 36 in the secure non-volatile memory 16. Therefore, in some embodiments, only one of the random secret keys 36 is stored in the secure non-volatile memory 16 at any one time.

The processing element 12 is configured to verify (block 344) the symmetric MAC 34 stored in the storage element 14 responsively to the previous random secret key 36 currently in the register 22.

In some embodiments, the processing element 12 is configured to compute an HMAC of the data item 28 as input and the random secret key 36 (currently in the register 22) as the HMAC key and then compare the computed HMAC to the symmetric MAC 34 (stored in the storage element 14) to verify the symmetric MAC 34.

In some embodiments, the processing element 12 is configured to hash the data item 28 using a suitable (cryptographic) hashing algorithm (e.g., SHA-3 or BLAKE3) (optionally using a suitable key such as the random secret key 36 (currently in the register 22)) and optionally encrypt the outputted hash value using a symmetric encryption algorithm, such as AES or triple-DES, with the random secret key 36 (currently in the register 22) as the encryption key. The processing element 12 is then configured to compare the hash or encrypted hash to the symmetric MAC 34 (stored in the storage element 14) to verify the symmetric MAC 34.

At a decision block 346, if the verification of the symmetric MAC 34 was unsuccessful (branch 348) the process continues with the step of block 304 (FIG. 3A) where the asymmetric digital signature 30 is verified (e.g., using the public key 32) in order to authenticate the data item 28. If the verification of the symmetric MAC 34 is successful (branch 350), the processing element 12 is configured to: utilize (block 352) the data item 28 (e.g., execute the data item 28, or use data from the data item 28 such as data from a digital certificate); generate (block 354) a new symmetric MAC 34 responsively to the data item 28 and the newly generated random secret key 36 (stored in the secure non-volatile memory 16); and store (block 356) the new symmetric MAC 34 in the storage element 14. The step of block 352 may be performed after the step of block 354, for example, after the step of block 356. The steps described herein may be performed in any suitable order. The processing may return to the step of block 338 upon request to authenticate the data item 28 another time. In this manner, the processing element 12 is configured to repeatedly verify different symmetric MACs 34 to repeatedly authenticate the data item 28 in different verification rounds.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A recipient apparatus combining asymmetric signature authentication with symmetric MAC verification, comprising: a storage element; and a processor configured to:
   receive a data item and an asymmetric signature of the data item from an originator of the data item, the asymmetric digital signature being computed by the originator using a private key of the originator;
   verify the asymmetric digital signature using a public key of the originator thereby authenticating the data item signed with the asymmetric digital signature a first time the data item is to be authenticated;
   generate a random secret key;
   store the secret key in the storage element of the recipient apparatus;
   upon successful verification of the asymmetric digital signature, generate a symmetric MAC of the data item in the recipient apparatus based on the random secret key and the authenticated data item and store the symmetric MAC in a the storage element of the recipient apparatus; and
   a next time the data item is to be authenticated:
   retrieve the symmetric MAC from the storage element of the recipient apparatus;
   read the secret key from the storage element of the recipient apparatus; and
   verify the symmetric MAC in the recipient apparatus thereby authenticating the data item based on: the secret key generated and stored in the recipient apparatus; and the data item.

2. The apparatus according to claim 1, wherein the asymmetric digital signature is computed using the private key and the processor is configured to verify the asymmetric digital signature using a the public key corresponding with the private key.

3. The apparatus according to claim 1, further comprising a secure non-volatile memory, and wherein the processor is configured to:
   generate a random secret key;
   store the secret key in the secure non-volatile memory;
   generate the symmetric MAC based on the secret key and the data item;
   read the secret key from the secure non-volatile memory; and
   verify the symmetric MAC based on the secret key and the data item.

4. The apparatus according to claim 1, wherein the processor is configured to verify the symmetric MAC multiple times thereby authenticating the data item multiple times.

5. The apparatus according to claim 1, wherein the processor is configured to: generate different symmetric MACs of the data item; and verify the different symmetric MACs thereby authenticating the data item multiple times.

6. The apparatus according to claim 5, wherein the processor is configured to:
   generate respective random secret keys;
   generate the respective different symmetric MACs based on the respective random secret keys and the data item;
   verify the respective different symmetric MACs based on the respective random secret keys and the data item; and
   overwrite each of the respective random secret keys after being read for use in verifying each of the respective symmetric MACs.

7. The apparatus according to claim 6, wherein the processor is configured to overwrite each of the respective random secret keys prior to verification of a subsequent one of the respective different symmetric MACs.

8. The apparatus according to claim 7, further comprising a secure non-volatile memory, and wherein the processor is configured to overwrite a previous one of the random secret keys with a given random secret key of the random secret keys in the secure non-volatile memory, wherein only one of the random secret keys is stored in the secure non-volatile memory at any one time.

9. The apparatus according to claim 8, wherein:
   the processor includes a second memory;
   the processor is configured to read the previous random secret key from the secure non-volatile memory and write the read previous random secret key into the second memory, and then overwrite the previous random secret key with the given random secret key in the secure non-volatile memory;
   the processor is configured to verify a respective one of the symmetric MACs stored in the storage element based on the previous random secret key currently in the second memory; and
   the processor is configured to: generate a new one of the symmetric MACs based on the data item and the given random secret key; and store the new symmetric MAC in the storage element.

10. The apparatus according to claim 1, wherein the data item is boot image.

11. The apparatus according to claim 1, wherein the data item is a digital certificate signed with a certificate authority private key.

12. An authentication method combining asymmetric signature authentication with symmetric MAC verification, the method comprising:
  receiving by a recipient apparatus a data item and an asymmetric signature of the data item from an originator of the data item, the asymmetric digital signature being computed by the originator using a private key of the originator;
  verifying the asymmetric digital signature using a public key of the originator thereby authenticating the data item signed with the asymmetric digital signature a first time the data item is to be authenticated;
  generating a random secret key by the recipient apparatus;
  storing the secret key in the recipient apparatus;
  upon successful verification of the asymmetric digital signature, generating a symmetric MAC of the data item by the recipient apparatus based on the random secret key and the authenticated data item and storing the symmetric MAC in the recipient apparatus; and
  a next time the data item is to be authenticated:
  retrieving the symmetric MAC stored by the recipient apparatus;
  reading the secret key from storage by the recipient apparatus; and
  verifying the symmetric MAC in the recipient apparatus thereby authenticating the data item based on: the secret key generated and stored in the recipient apparatus; and the data item.

13. The method according to claim 12, wherein the asymmetric digital signature is computed using the private key and the verifying includes verifying the asymmetric digital signature using a the public key corresponding with the private key.

14. The method according to claim 12, further comprising:
  generating a random secret key;
  store the secret key;
  generating the symmetric MAC based on the secret key and the data item; and
  retrieving the secret key, and wherein the verifying includes verifying the symmetric MAC based on the secret key and the data item.

15. The method according to claim 12, further comprising verifying the symmetric MAC multiple times thereby authenticating the data item multiple times.

16. The method according to claim 12, further comprising:
  generating respective different symmetric MACs of the data item; and
  verifying the respective different symmetric MACs thereby authenticating the data item multiple times.

17. The method according to claim 16, further comprising:
  generating respective random secret keys;
  generating the respective different symmetric MACs based on the respective random secret keys and the data item, wherein the verifying the respective different symmetric MACs includes verifying the respective different symmetric MACs based on the respective random secret keys and the data item; and
  overwriting each of the respective random secret keys after being read for use in verifying each of the respective symmetric MACs.

18. The method according to claim 17, wherein the overwriting includes overwriting each of the respective random secret keys prior to verification of a subsequent one of the respective different symmetric MACs.

19. The method according to claim 18, further comprising overwrite a previous one of the random secret keys with a given random secret key of the random secret keys in a secure non-volatile memory, wherein only one of the random secret keys is stored in the secure non-volatile memory at any one time.

20. The method according to claim 19, further comprising:
  reading the previous random secret key from the secure non-volatile memory and writing the read previous random secret key into a second memory, and then performing the overwriting of the previous random secret key with the given random secret key in the secure non-volatile memory;
  verifying a respective one of the symmetric MACs based on the previous random secret key currently in the second memory;
  generating a new one of the symmetric MACs based on the data item and the given random secret key; and
  storing the new symmetric MAC.

21. The method according to claim 12, wherein the data item is boot image.

22. The method according to claim 12, wherein the data item is a digital certificate signed with certificate authority private key.

23. A computer product, comprising a non-transient computer-readable medium in which program instructions are stored, which instructions, when read by a central processing unit (CPU), cause the CPU to:
  receive a data item and an asymmetric signature of the data item from an originator of the data item, the asymmetric digital signature being computed by the originator using a private key of the originator;
  store the data item signed with the asymmetric digital signature;
  verify the asymmetric digital signature using a public key of the originator thereby authenticating the data item signed with the asymmetric digital signature a first time the data item is to be authenticated;
  generate a random secret key;
  store the secret key in a recipient apparatus;
  upon successful verification of the asymmetric digital signature, generate a symmetric MAC of the data item in the recipient apparatus based on the random secret key and the authenticated data item and store the symmetric MAC in the recipient apparatus; and
  a next time the data item is to be authenticated:
  retrieve the symmetric MAC stored in the recipient apparatus;
  read the secret key from storage of the recipient apparatus; and
  verify the symmetric MAC in the recipient apparatus thereby authenticating the data item based on: the secret key generated and stored in the recipient apparatus; and the data item.

* * * * *